(12) United States Patent
Murayama et al.

(10) Patent No.: US 9,106,899 B2
(45) Date of Patent: *Aug. 11, 2015

(54) IMAGE PICKUP APPARATUS

(75) Inventors: Kazuaki Murayama, Hachioji (JP); Hisashi Goto, Suginami-ku (JP); Kengo Enomoto, Tachikawa (JP); Kazuya Yamanaka, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 910 days.

This patent is subject to a terminal disclaimer.

(21) Appl. No.: 13/324,152

(22) Filed: Dec. 13, 2011

(65) Prior Publication Data
US 2012/0147151 A1 Jun. 14, 2012

(30) Foreign Application Priority Data
Dec. 13, 2010 (JP) .................. 2010-276864

(51) Int. Cl.
*H04N 13/02* (2006.01)
*G03B 5/00* (2006.01)
*G03B 35/02* (2006.01)

(52) U.S. Cl.
CPC .............. *H04N 13/0221* (2013.01); *G03B 5/00* (2013.01); *G03B 35/02* (2013.01); *H04N 13/0296* (2013.01)

(58) Field of Classification Search
CPC ...... G03B 35/02; G03B 5/00; H04N 13/0221; H04N 13/0296
See application file for complete search history.

(56) References Cited

U.S. PATENT DOCUMENTS

| 2002/0009137 A1* | 1/2002 | Nelson et al. .............. 375/240.1 |
| 2010/0033555 A1* | 2/2010 | Nagase et al. ................. 348/43 |

FOREIGN PATENT DOCUMENTS

| JP | 9-171221 A | 6/1997 |
| JP | 2005-323065 A | 11/2005 |
| JP | 2010-041381 A | 2/2010 |

* cited by examiner

*Primary Examiner* — Sath V Perungavoor
*Assistant Examiner* — Peter D Le
(74) *Attorney, Agent, or Firm* — Westerman, Hattori, Daniels & Adrian, LLP

(57) ABSTRACT

An apparatus has a synchronizing signal generator to which a trigger signal is input and that outputs a first synchronizing signal and a second synchronizing signal based on the trigger signal, an image pickup unit that has an image pickup surface, performs a first image picking-up based on the first synchronizing signal, and performs a second image picking-up based on the second synchronizing signal, and an image pickup element tilting unit that changes the angle of the image pickup surface relative to the optical axis during a period after the first image picking-up and before the second image picking-up.

12 Claims, 9 Drawing Sheets

IMAGE PICKUP APPARATUS

CROSS-REFERENCE TO RELATED APPLICATION

The present application is based upon and claims the benefit of priority from the prior Japanese Patent Application No. 2010-676864 filed on Dec. 13, 2010; the entire contents of which are incorporated herein by reference.

BACKGROUND OF THE INVENTION

1. Field of the Invention

The present invention relates to an image pickup apparatus.

2. Description of the Related Art

There have been developed an image pickup apparatus for obtaining a stereoscopic image. The image pickup apparatus has two taking optical systems arranged side-by-side along the horizontal direction of the image pickup apparatus (e.g. digital camera body), on which light from an object enters simultaneously, and two CCD sensors provided respectively for the two taking optical systems to convert optical images formed by the respective taking optical systems into image signals. This image pickup apparatus obtains and reproduces a stereoscopic image using the difference (or parallax) between the two images thus obtained.

In a prior art image pickup apparatus, at least one lens provided in a taking optical system is shifted to obtain parallax images using the one taking optical system in a time sharing manner.

For instance, Japanese Patent Application Laid-Open No. 2005-323065 describes a digital camera that shifts at least one of the plurality of lenses arranged on the optical axis in the horizontal direction perpendicular to the optical axis to obtain images with horizontal parallax.

In the electronic camera described in Japanese Patent Application Laid-Open No. 2010-41381, as with Japanese Patent Application Laid-Open No. 2005-323065, at least one of a plurality of lenses arranged on the optical axis is shifted in the horizontal direction perpendicular to the optical axis to obtain images with horizontal parallax.

A stereoscopic image forming apparatus described in Japanese Patent Application Laid-Open No. 9-171221 has shifting means for changing the relative position of an object and an image pickup unit that picks up an image of the object to obtain images along first and second directions.

SUMMARY OF THE INVENTION

An apparatus according to the present invention comprises a synchronizing signal generator to which a trigger signal is input and that outputs a first synchronizing signal and a second synchronizing signal based on the trigger signal, an image pickup unit that has an image pickup surface, performs a first image picking-up in response to the first synchronizing signal, and performs a second image picking-up in response to the second synchronizing signal, and an image pickup element tilting unit that changes the angle of the image pickup surface relative to the optical axis during a period after the first image picking-up and before the second image picking-up.

DETAILED DESCRIPTION OF THE INVENTION

In the following, embodiments of the image pickup apparatus according to the present invention will be described in detail with reference to the accompanying drawings. should be understood that the present invention is not limited by the embodiments.

The image pickup apparatus according to the present invention is provided with an taking optical system and an image pickup element and adapted to pick up images in different states with different angles of the image pickup element relative to the taking optical system, thereby obtaining a stereoscopic image. Thus, a stereoscopic image can be obtained from images, which are not two or more images with parallax that are needed in conventional apparatus, without special image processing.

First Embodiment

Figure 1:
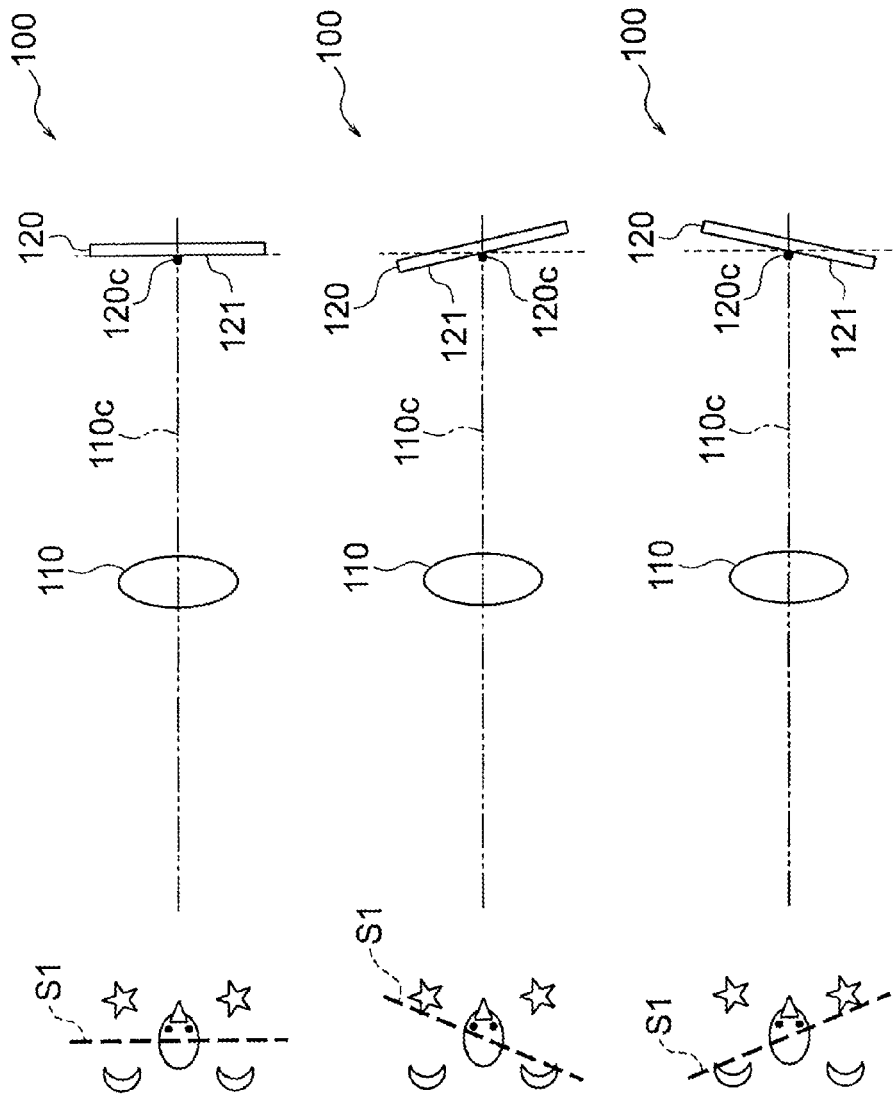
FIGS. 1A, 1B, and 1C are top views showing the scheme of a digital camera according to a first embodiment.
Figure 2:
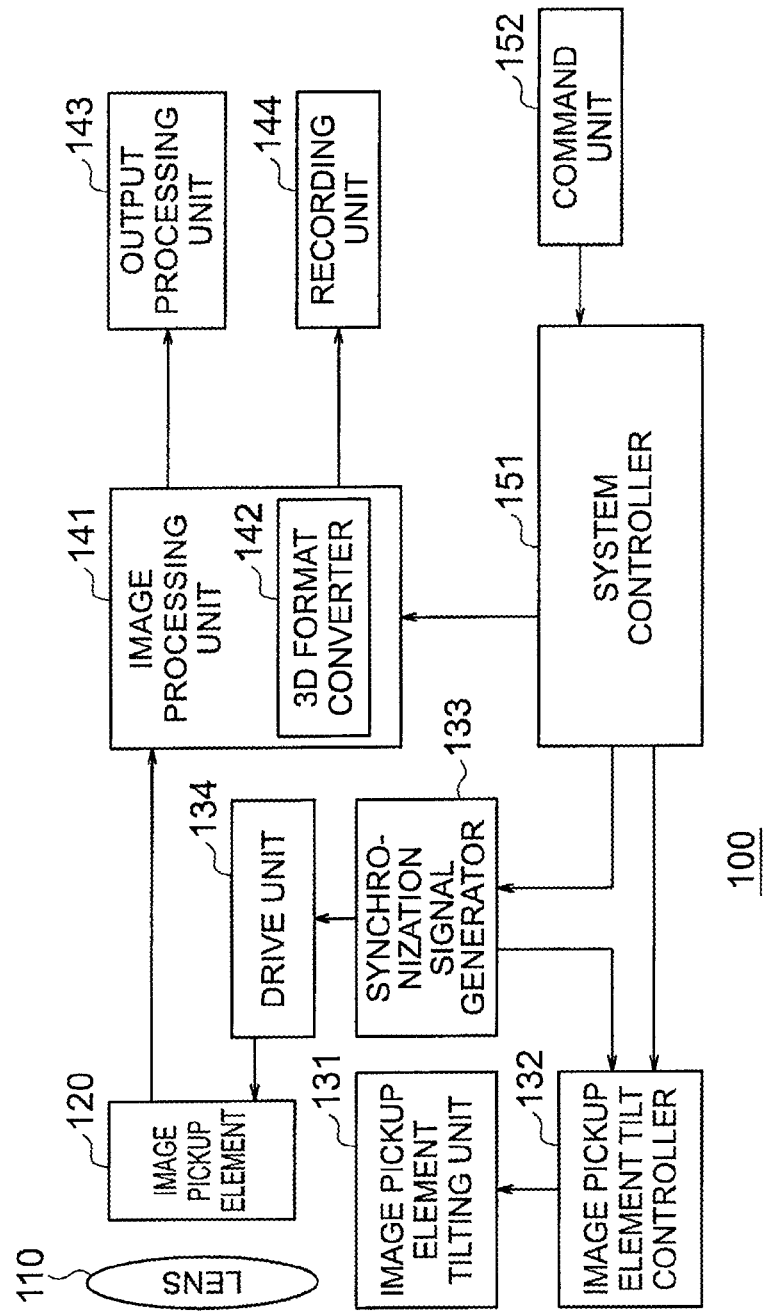
FIG. 2 is a block diagram of the digital camera according to the first embodiment.

FIGS. 1A, 1B, and 1C are top views showing the scheme of a digital camera 100 according to a first embodiment. FIG. 2 is a block diagram of the digital camera 100.

The digital camera (image pickup apparatus) 100 has a taking lens (taking optical system) 110, an image pickup element 120, and an image pickup element tilting unit 131.

A tilt axis (field tilt axis, swing axis) 120c is provided on the image pickup surface 121 of the image pickup element 120 and located on the extension of the optical axis 110c of the taking lens 110, on the plane of FIGS. 1A to 1C. The image pickup element tilting unit 131 can tilt the image pickup element 120 in horizontal directions (in vertical directions in FIGS. 1A, 1B, and 1C) about the tilt axis 120c. Thus, the angle of the image pickup surface 121 of the image pickup element 120 relative to the optical axis 110c is changed by the operation of the image pickup element tilting unit 131. The image pickup element can be tilted from the normal position shown in FIG. 1A in which the image pickup surface 121 is perpendicular to the optical axis 110c to a position (as shown in FIG. 1B) in which the right edge (or the upper edge in FIGS. 1A, 1B, and 1C) of the image pickup surface 121 is made closer to the taking lens 110 and the left edge (or the lower edge in FIGS. 1A, 1B, and 1C) is made farther from the taking lens 110 or to a position (as shown in FIG. 1C) in which the left edge of the image pickup surface 121 is made closer to the taking lens 110 and the right edge is made farther from the taking lens 110.

In the normal position shown in FIG. 1A the object plane S1 is perpendicular to the optical axis 110c. As the image pickup element 120 is swung as shown in FIG. 1B, the object plane S1 is inclined in such a way that the right edge (or the upper edge in FIGS. 1A, 1B, and 1C) becomes closer to the taking lens 110 and the left edge (or the lower edge in FIGS. 1A, 1B, and 1C) becomes farther from the taking lens 110. As the image pickup element 120 is swung as shown in FIG. 1C, the object plane S1 is inclined in such a way that the left edge becomes closer to the taking lens 110 and the right edge becomes farther from the taking lens 110. The object plane inclines as above according to the Scheimpflug principle, which will be described later.

In this digital camera 100, a stereoscopic image can be obtained from a pair of images without parallax, which are an image (a first image or left eye image) obtained by actuating the image pickup element 120 in the position shown in FIG. 1B and an image (a second image or right eye image) obtained by actuating the image pickup element 120 in the position shown in FIG. 1C. More specifically, the digital camera 100 obtains a right eye image by picking up an image while tilting the image pickup surface 121 of the image pickup element 120 in such a way that it runs from near left to far right so that the object plane S1 is inclined in such a way as to run from near right to far left as shown in FIG. 1B. The digital camera 100 also obtains a left eye image by picking up an image while tilting the image pickup surface 121 of the image pickup element 120 in such a way that it runs from near right to far left so that the object plane S1 is inclined in such a way as to run from near left to far right as shown in FIG. 1C. A stereoscopic image is obtained from the pair of images thus picked up.

Figure 3:
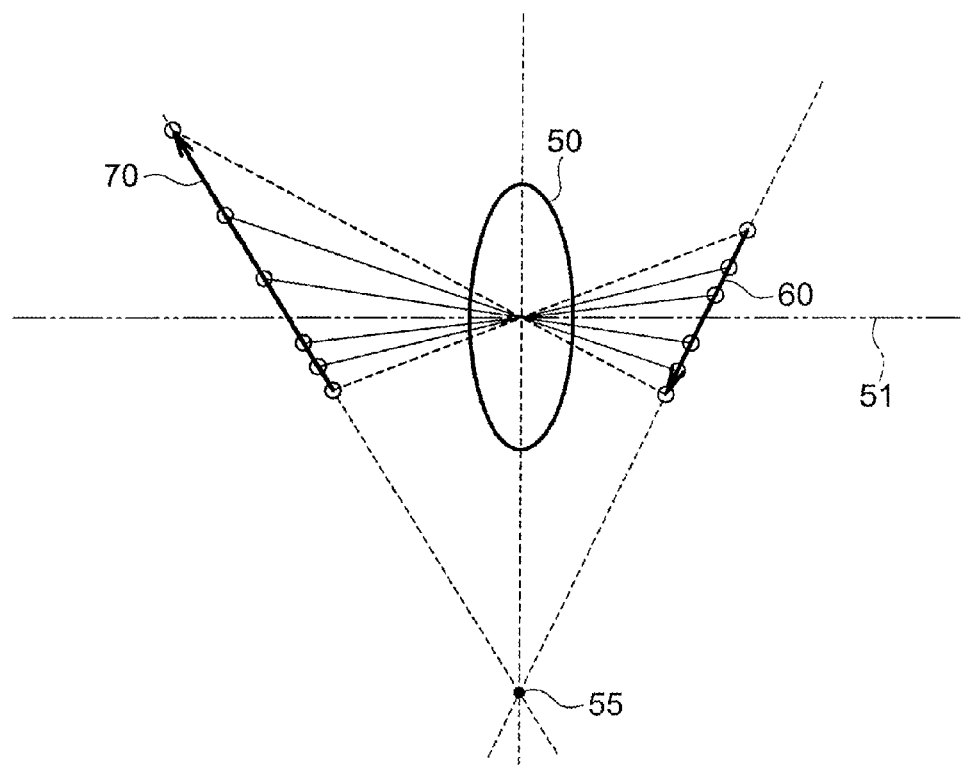
FIG. 3 is a schematic diagram for illustrating the Scheimpflug principle.

The Scheimpflug principle will be explained here with reference to FIG. 3. FIG. 3 is a schematic diagram for illustrating the Scheimpflug principle.

When the image pickup surface and the principal plane of the lens are not parallel, the object plane is not parallel to the principal plane of the lens, and the image plane, the principal plane of the lens, and the object plane intersect on the same single line (represented by intersection point 55 in FIG. 3).

When the image pickup surface 60 of the image pickup element is oriented perpendicular to the optical axis 51 of the taking lens 50, the object plane 70 also lies perpendicular to the optical axis. On the other hand, when the image pickup surface 60 is inclined in an angle other than 90 degrees as illustrated in FIG. 3, the object plane 70 is inclined or tilted correspondingly to the inclination of the image pickup surface 60 according to the Scheimpflug principle. In addition, if the angle of the image pickup surface 60 is changed, the magnification of the image plane in the height direction varies with respect to the optical axis 51.

According to the above-described principle, an image in which object points along depth directions are in focus can be obtained irrespective of whether there is a parallax or not. Therefore, a stereoscopic image can be created.

Creation of a stereoscopic image will be described more specifically.

First, a first image is obtained by tilt photography performed in a state in which the image pickup surface 60 is tilted relative to the optical axis 51 of the taking lens 50 in such a way that its left side (the lower side in FIG. 3) is made closer to the taking lens 50 and its right side (the upper side in FIG. 3) is made farther from the taking lens 50 as shown in FIG. 3. Then, a second image is obtained in a state in which the image pickup element is tilted in the opposite direction. Specifically, the second image is obtained by tilt photography performed in a state in which the image pickup surface 60 is tilted relative to the optical axis 51 in such a way that its right side is made closer to the taking lens 50 and its left side is made farther from the taking lens 50. The first and second images are stored in pair as a stereoscopic (or 3D) image in a memory.

The first image and the second image are obtained as tilted image picked up at different viewpoints.

When outputting (or reproducing) an image, a stereoscopic image can be created by outputting the first image and the second image in pair simultaneously.

The operation and control of the digital camera 100 will be described in more detail with reference to FIG. 2.

As shown in FIG. 2, the digital camera 100 is provided with the taking lens 110, the image pickup element 120, the image pickup element tilting unit 131, an image pickup element tilt controller 132, a synchronizing signal generator 133, a drive unit 134, an image processing unit 141, a 3D format converter 142, an output processing unit 143, a recording unit 144, a system controller 151, and a command section 152.

The digital camera 100 according to the first embodiment can widely be applied to various apparatuses having the function of motion picture display and the function of motion picture taking, such as digital cameras, digital video cameras, surveillance cameras, and cellular phones having a picture taking function.

The taking lens 110 is a taking optical system for forming an optical image of an object on the image pickup surface 121 of the image pickup element 120. The taking lens 110 has a stop and focusing lens etc.

The image pickup element 120 has the image pickup surface 121 on which a plurality of pixels are arranged to photoelectrically convert an optical image of an object formed by the taking lens 110 into an electrical image signal. The image pickup element 120 is capable of performing, at desired timing, pixel resetting (electrical leading shutter curtain) and image reading (electrical trailing shutter curtain) sequentially on a pixel by pixel basis or line by line basis. In other words, the image pickup element 120 is capable of varying the exposure time. The image pickup element 120 may be, but not limited to, an XY address image pickup element such as a CMOS image pickup element.

The synchronizing signal generator 133 is controlled by the system controller 151 to generate a vertical synchronizing signal VD that provides a basis for the timing of driving of the image pickup element 120.

In the case where there is a vertical synchronization period (corresponding to the image pickup frame rate) determined based on an input from the command section 152, the system controller 151 outputs a trigger signal to the synchronizing signal generator 133 and sets the vertical synchronization period in the synchronizing signal generator 133.

On the other hand, in the case where there is not a vertical synchronization period determined based on an input from the command section 152, the system controller 151 sets a predetermined vertical synchronization period in the synchronizing signal generator 133. The predetermined vertical synchronization period may be, for example, a vertical synchronization period corresponding to an image pickup frame rate given as a standard value or a vertical synchronization period corresponding to the image pickup frame rate currently used in driving the image pickup element 120.

The system controller 151 controls the synchronizing signal generator 133 so that the synchronizing signal generator 133 generates a vertical synchronizing signal VD with the vertical synchronization period set in the synchronizing signal generator 133 in the above manner.

The drive unit 134 is controlled by the system controller 151 to generate a read start pulse and an electronic shutter release start pulse at timing determined based on the vertical synchronizing signal VD generated by the synchronizing signal generator 133, thereby driving the image pickup element 120.

The image pickup element tilt controller 132 is controlled by the system controller 151 to control the tilting of the image pickup element 120 at timing determined based on the vertical synchronizing signal VD generated by the synchronizing signal generator 133. Specifically, the image pickup element tilt controller 132 controls the tilting in such a way that the tilting operation of the image pickup element 120 is completed during the blanking interval of the vertical synchronizing signal VD. The system controller 151 controls the tilting of the image pickup element 120 with the tilt angle of the image pickup element 120 set according to the 3D mode determined based on an input from the command section 152.

The tilting of the image pickup element 120 by the image pickup element tilt controller 132 includes not only swinging (move rotationally) the image pickup surface 121 in an orientation perpendicular to the optical axis 110c to an orientation not perpendicular to the optical axis 110c but also swinging the image pickup surface 121 in an orientation not perpendicular to the optical axis 110c to an orientation perpendicular to the optical axis 110c or another orientation.

The image pickup element tilting unit 131 tilts the image pickup element in accordance with a control command from the image pickup element tilt controller 132. The tilting may be performed using a voice coil motor (VCM), a stepping motor, an ultrasonic motor, or any other actuator with which the image pickup element can be tilted.

The image processing unit 141 applies various image processing to image signals picked up by and read out from the image pickup element 120. The image processing unit 141 includes the 3D format converter 142. When a 3D mode is selected by the command section 152, the 3D mode is set in the 3D format converter 142 by the system controller 151. The 3D format converter 142 performs 3D mode conversion according to the mode thus set. Examples of the 3D mode conversion include SIDE-BY-SIDE, LINE-BY-LINE, ABOVE-BELOW, and CHECKERBOARD.

The output processing unit 143 outputs an image processed by the image processing unit 141 for display (including an image after 3D format conversion) to an external display apparatus such as a television. In addition, the output processing unit 143 also outputs an image to a display device for displaying the operation menu of the digital camera 100 etc.

The recording unit 144 stores, in a nonvolatile manner, image data processed by the image processing section 141 for recording. The recording unit 144 may be, for example, a removable memory, such as a memory card, that can be taken out from the image pickup apparatus. Therefore, the recording unit 144 may not necessarily be a component belonging to the image pickup element.

The command section 152 is a user interface used to make operational entries to the digital camera 100. The command section 152 includes a power button for turning on/off the power, an image taking button for starting image taking, an image taking mode setting button for setting the 3D mode etc, and other various setting buttons.

Figure 4:
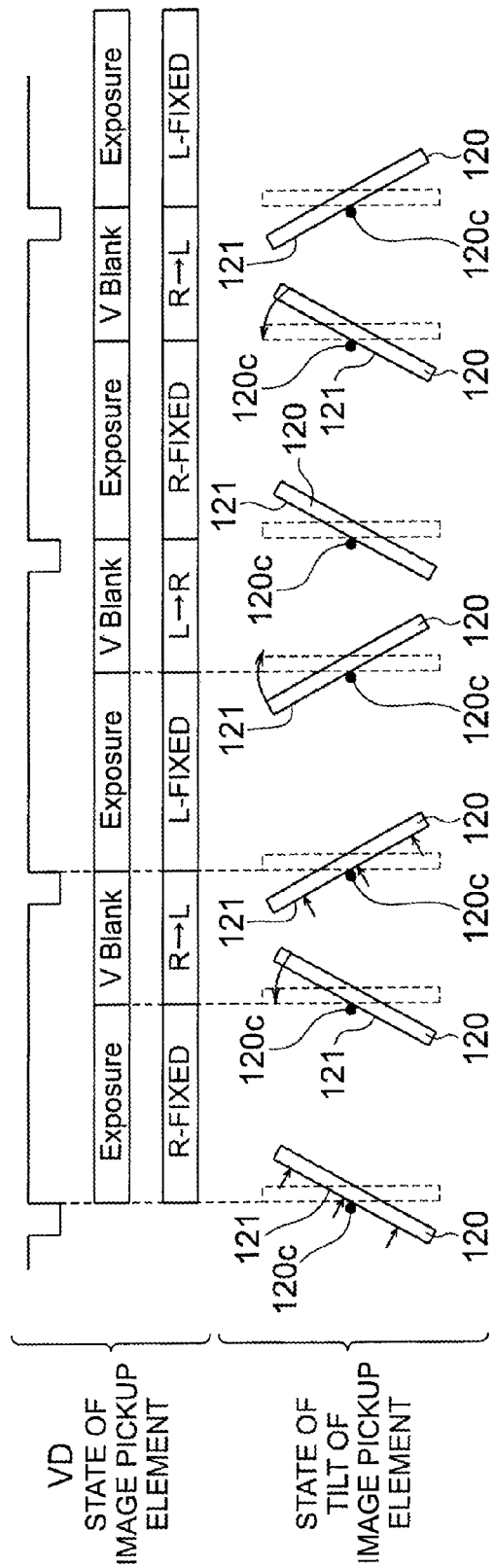
FIG. 4 shows a vertical synchronizing signal and the state of an image pickup element in relation to each other.

In the following, how the image pickup element is tilted will be described in detail with reference to FIG. 4. FIG. 4 shows the vertical synchronizing signal and the state (or orientation) of the image pickup element in relation to each other.

FIG. 4 shows the vertical synchronizing signal VD of the image pickup element 120, the exposure period "EXPOSURE" of the image pickup element 120, the vertical blanking interval "V BLANK" of the image pickup element 120, the state "R-FIXED" in which a right image is picked up by in the 3D image pickup mode, and the state "L-FIXED" in which a left image is picked up by in the 3D image pickup mode, in relation to time that progresses in the horizontal direction. In FIG. 4, the tilt state of the image pickup element 120 is seen from the above.

When the digital camera 100 is set to the 3D mode, the image pickup element 120 is tilted during vertical blanking intervals of the image pickup element 120 based on the vertical synchronizing signal VD of the image pickup element 120 to allow picking up of a left or right image. In connection with this, the vertical synchronizing signal VD used to pick up a left or right image in the state in which the image pickup element 120 is tilted leftward or rightward serves as the first synchronizing signal and the second synchronizing signal.

On the other hand, during the exposure of the image pickup element 120, the image pickup element 120 is kept stationary (fixed) in the tilted state in which a right or left image can be picked up. The above-described tilting operation is performed repeatedly to pick up right and left images alternately.

The image pickup element 120 can be tilted to a plurality of angles according to the 3D mode as set.

Second Embodiment

A digital camera (image pickup apparatus) 200 according to a second embodiment differs from the digital camera 100 according to the first embodiment in that the digital camera 200 has an orientation detector 260 that detects the orientation of the camera. The components same as those in the digital camera 100 according to the first embodiment are denoted by the same reference symbols and will not be described in detail.

Figure 5:
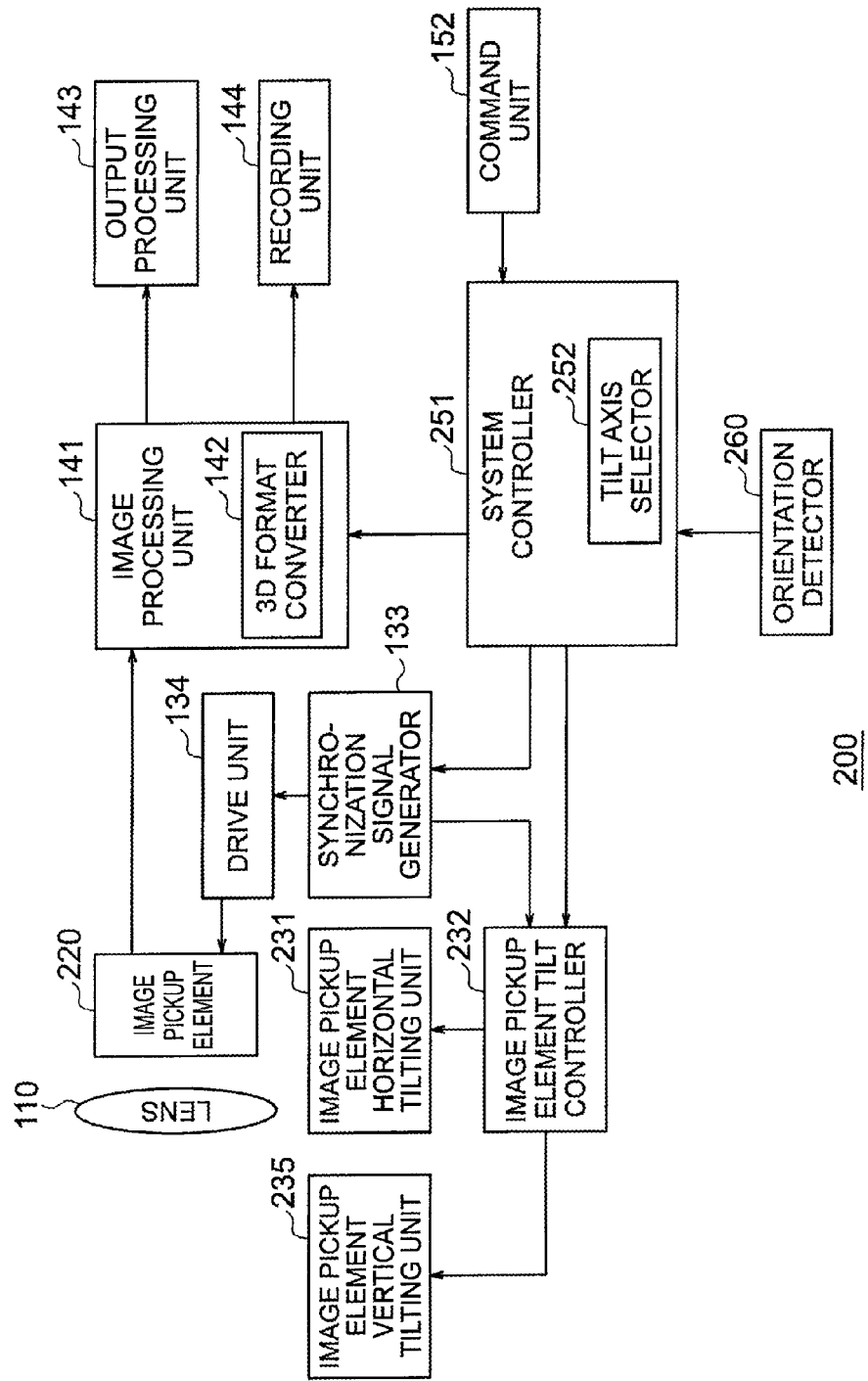
FIG. 5 is a block diagram of a digital camera according to a second embodiment.
Figure 6:
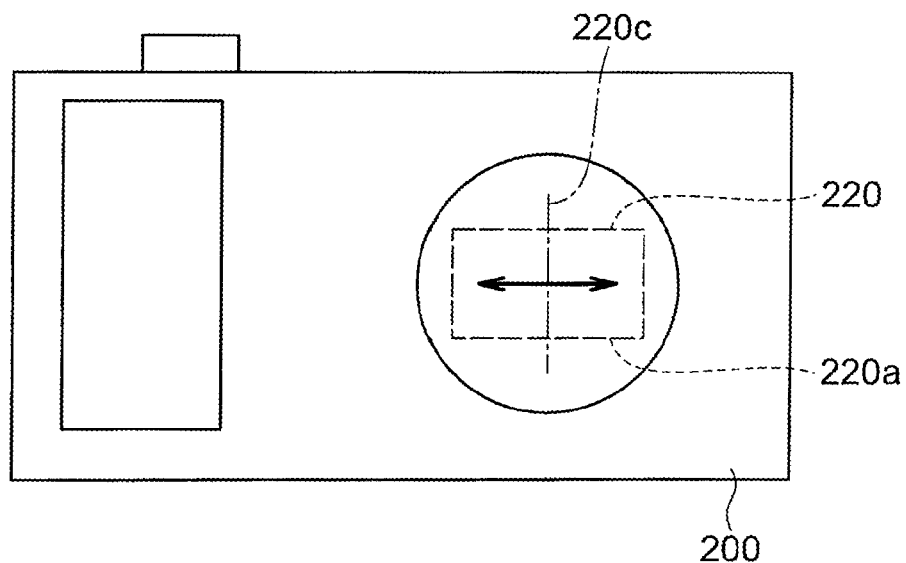
FIG. 6 is a front view of the digital camera according to the second embodiment in the horizontal orientation, in which and an image pickup element and a tilt axis are shown.
Figure 7:
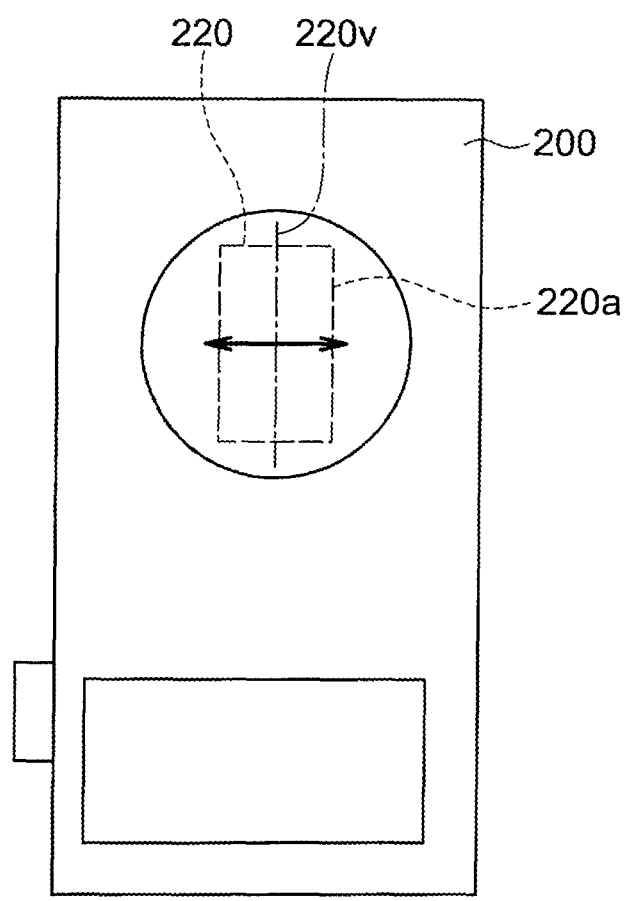
FIG. 7 is a front view of the digital camera according to the second embodiment in the vertical orientation, in which the image pickup element and a tilt axis are shown.

FIG. 5 is a block diagram showing the configuration of the digital camera 200. FIG. 6 is a front view of the digital camera 200 in the horizontal orientation, in which the image pickup element 220 and the tilt axis 220c are shown. FIG. 7 is a front view of the digital camera 200 in the vertical orientation, in which the image pickup element 220 and the tilt axis 220v are shown.

The digital camera 200 has an image pickup element horizontal tilting unit 231 and an image pickup element vertical tilting unit 235 in place of the image pickup element tilting unit 131 in the first embodiment. The digital camera 200 also has an image pickup element tilt controller 232 and a system controller 251 in place of the image pickup element tilt controller 132 and the system controller 151. The digital camera 200 further has the orientation detector 260. The system controller 251 includes a tilt axis selector 252.

The orientation detector 260 is a sensor that detects whether the digital camera 200 is in the horizontal orientation (as shown in FIG. 6) or in the vertical orientation (as shown in FIG. 7). The orientation detector 260 sends a signal indicative of the result of detection to the tilt axis selector 252 in the system controller 251. The orientation detector 260 detects that the digital camera 200 is held in the horizontal orientation in which the longer side 220a of the horizontally long, rectangular image pickup element 220 is oriented horizontally as shown in FIG. 6 and that the digital camera 200 is held in the vertical orientation in which the longer side 220a of the image pickup element 220 is oriented vertically as shown in FIG. 7.

In the digital camera 200, two tilt axes (swing axes) of the image pickup element 220 are provided in the vicinity of the image pickup surface of the image pickup element 220, in a plane perpendicular to the optical axis 110c. These two axes both intersect the optical axis 110c of the taking lens 110. One of them is a tilt axis 220c (FIG. 6) that is perpendicular to the longer side 220a of the image pickup element 220, and the other of them is a tilt axis 220v (FIG. 7) that is parallel to the longer side 220a of the image pickup element 220.

The tilt axis selector 252 selects either one of the tilt axes 220c, 220v based on the result of detection received from the orientation detector 260 to determine the tilt axis. Furthermore, the tilt axis selector 252 sets the tilt axis for the image pickup element tilt controller 232.

when the horizontal orientation is set in accordance with the setting by the tilt axis selector 252, the image pickup element tilt controller 232 actuates the image pickup element horizontal tilting unit 231 to swing the image pickup element 220 about the tilt axis 220c, thereby tilting the image pickup element 220 in a horizontal direction. On the other hand, when the vertical orientation is set in accordance with the setting by the tilt axis selector 252, the image pickup element tilt controller 232 actuates the image pickup element vertical tilting unit 235 to swing the image pickup element 220 about the tilt axis 220v, thereby tilting the image pickup element 220 in a vertical direction.

With the above-described features and the operations, an appropriate tilt axis is selected in accordance with the orientation of the digital camera 200. In consequence, stereoscopic images can be obtained stably.

The features, operations, and effects of the second embodiment other than described above are the same as those in the first embodiment.

Third Embodiment

A digital camera 300 according to the third embodiment differs from the digital camera 100 according to the first embodiment in that the tilt axis 320c of the image pickup element 320 is not located on the extension of the optical axis 110c of the taking lens 110. The features other than this are the same as those in the digital camera 100 according to the first embodiment. The components same as those in the digital camera 100 according to the first embodiment are denoted by the same reference symbols and will not be described in detail.

Figure 8A:
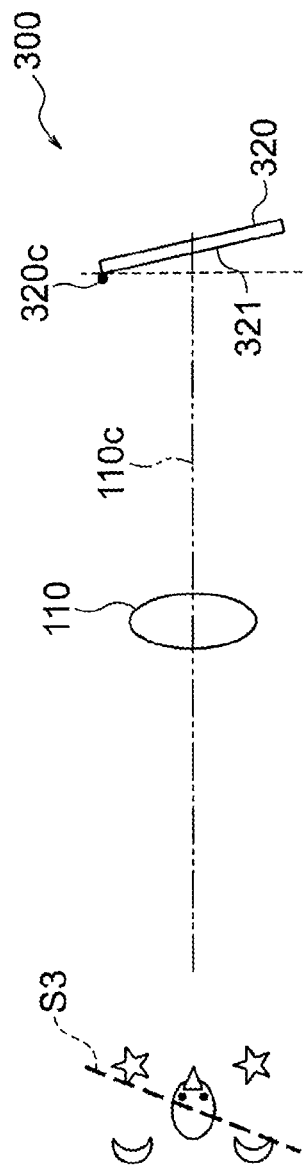
FIGS. 8A and 8B are top views showing the scheme of a digital camera according to a third embodiment.
Figure 8B:
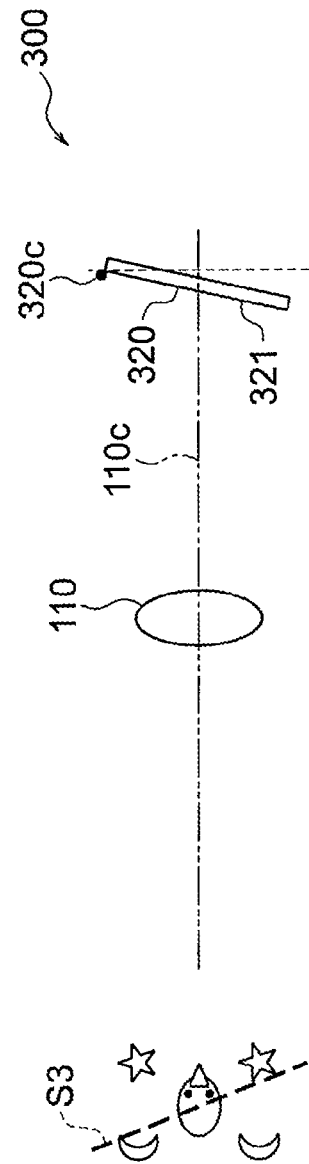
Figure 9:
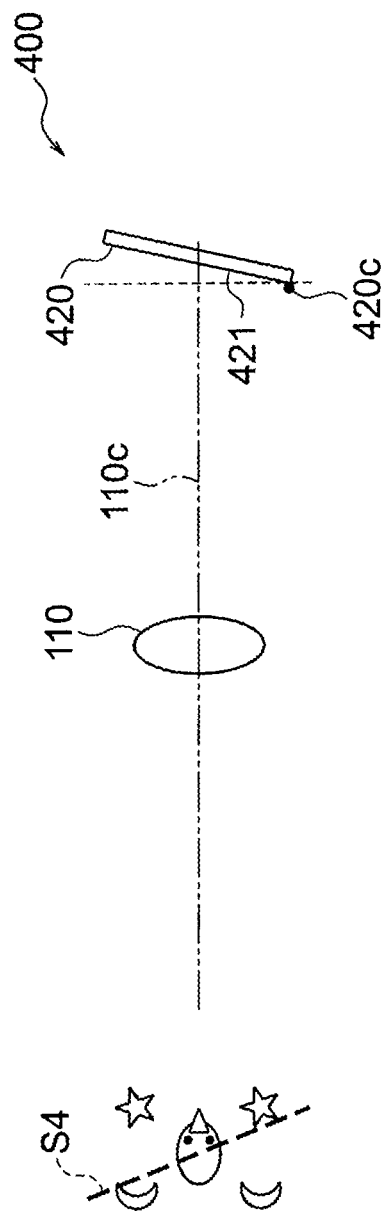
FIG. 9 is a top view showing the scheme of a digital camera (image pickup apparatus) 400 according to a modification of the third embodiment.

FIGS. 8A and 8B are top views for illustrating the scheme the digital camera (image pickup apparatus) 300 according to the third embodiment. FIG. 9 is a top view for illustrating the scheme of a digital camera (image pickup apparatus) 400 according to a modification of the third embodiment.

As shown in FIGS. 8A, 8B, and 9, the tilt axis or the center of swing of the image pickup element is arranged offset from the extension of the optical axis 110c.

FIGS. 8A and 8B shows a case in which the image pickup element 320 is swung about the tilt axis (swing axis) 320c provided in the vicinity of the right edge of the image pickup surface 321 of the image pickup element 320.

FIG. 8A shows a state in which the image pickup element 320 is tilted in such a way that the left edge (or the lower edge in FIGS. 8A and 8B) of the image pickup surface 321 of the image pickup element 320 is made farther from the taking lens 110. In the state shown in FIG. 8A, the object plane S3 is inclined in such a way that its right side (or the upper side in FIGS. 8A and 8B) is made closer to the taking lens 110 and the left side (or the lower side in FIGS. 8A and 8B) is made farther from the taking lens 110.

FIG. 8B shows a state in which the image pickup element 320 is tilted in such a way that the left edge of the image pickup surface 321 of the image pickup element 320 is made closer to the taking lens 110. In the state shown in FIG. 8B, the object plane S3 is inclined in such a way that its left side is made closer to the taking lens 110 and the right side is made farther from the taking lens 110.

The digital camera 300 obtains a right eye image by picking up an image while tilting the image pickup surface 321 of the image pickup element 320 in such a way that it runs from near left to far right so that the object plane S3 is inclined in such a way as to run from near right to far left as shown in FIG. 8A. The digital camera 300 also obtains a left eye image by picking up an image while tilting the image pickup surface 321 of the image pickup element 320 in such a way that it runs from near right to far left so that the object plane S3 is inclined in such a way as to run from near left to far right as shown in FIG. 8B. A stereoscopic image is obtained from the pair of images thus picked up.

FIG. 9 shows a case in which the image pickup element 420 is swung about a tilt axis (swing axis) 420c provided in the vicinity of the left edge of the image pickup surface 421 of the image pickup element 420. In the state shown in FIG. 9, the object plane S4 is inclined in such a way that its left side (or the lower side in FIG. 9) is made closer to the taking lens 110 and the right side (or the upper side in FIG. 9) is made farther from the taking lens 110. Although FIG. 9 shows a state in which the image pickup element 420 is tilted in such a way that the right edge (the upper edge in FIG. 9) of the image pickup surface 421 of the image pickup element 420 is made farther from the taking lens 110, the image pickup element 420 can also be tilted in such a way that right edge of the image pickup surface 421 is made closer to the taking lens 110.

A stereoscopic image can be obtained by the following combinations of the ways of image picking-up.

(1) A combination of two ways of image picking-up performed in the states in which the image pickup element tilted (or swung) leftward and rightward respectively about the same tilt axis (swing axis). Examples are the combination of the state shown in FIG. 1B and the state shown in FIG. 1C and the combination of the state shown in FIG. 8A and the state shown in FIG. 8B.

(2) A combination of ways of image picking-up performed respectively in the state in which the image pickup surface is oriented perpendicular to the optical axis 110c of the taking lens 110 and in the state in which the image pickup surface is inclined relative to the optical axis 110c of the taking lens 110. Examples are the combination of the state shown in FIG. 1A and the state shown in FIG. 1B or 1C and the combination of the state in which the image pickup surface 321 shown in FIGS. 8A and 8B is made perpendicular to the optical axis 110c and the state shown in FIG. 8A or 8B.

(3) A combination of two ways of image picking-up performed in the states in which the image pickup element is tilted (or swung) leftward and rightward respectively about the different tilt axes (swing axes). Examples are the combination of the state shown in FIG. 1B and the state shown in FIG. 8B or FIG. 9, the combination of the state shown in FIG. 1C and the state shown in FIG. 8A, and the combination of the state shown in FIG. 1B or 8A and the state shown in FIG. 9.

The stereoscopic images obtained will have the following characteristics according to the image pickup method.

(A) In the case of the above method (1), if the tilt axis 120c is on the extension of the optical axis 110c as is the case in the combination of the state shown in FIG. 1B and the state shown in FIG. 1C, the left and right images are highly symmetrical because the focus position on the optical axis 110c is maintained and the image pickup element is swung about one same axis.

(B) In the case of the above method (2), both 2D image pickup and 3D image pickup can be performed excellently, because an image is picked up in the state in which the image pickup surface is oriented perpendicular to the optical axis 110c.

(C) In the case of the above method (1), if the tilt axis 320c is offset from the extension of the optical axis 110c as is the case in the combination of the state shown in FIG. 8A and the state shown in FIG. 8B, the layout in the camera will be easy, because the axis of swing of the image pickup element 320 is offset from the center of the picture area of the image pickup surface 321.

(D) In the case of the above method (3), if the tilted image pickup surface is made only farther from the taking lens 110 as compared to that in the state perpendicular to the optical axis 110c as is the case with the combination of the state shown in FIG. 8A and the state shown in FIG. 9, the image pickup element 120 can be tilted without being made closer to the taking lens 110.

As described above, the image pickup apparatus according to the present invention is useful for stereoscopic (3D) imaging in a digital camera.

The image pickup apparatus according to the present invention is advantageous in that it can be made compact, have good optical performance, and obtain stereoscopic images stably.

What is claimed is:

1. An image pickup apparatus comprising:
   a synchronizing signal generator to which a trigger signal is input and that outputs a first synchronizing signal and a second synchronizing signal based on the trigger signal;
   an image pickup unit that has an image pickup surface, performs a first image picking-up in response to the first synchronizing signal, and performs a second image picking-up in response to the second synchronizing signal; and
   an image pickup element tilting unit that changes the angle of the image pickup surface relative to the optical axis during a period after the first image picking-up and before the second image picking-up.

2. The image pickup apparatus according to claim 1, wherein the apparatus comprises a swing axis that supports the image pickup surface in such a way that the image pickup surface is allowed to swing so that the angle of the image pickup surface relative to the optical axis can be changed.

3. The image pickup apparatus according to claim 2, wherein the swing axis is disposed in the vicinity of a pixel on the image pickup surface at the middle of one edge of the image pickup surface and the other edge of the image pickup surface.

4. The image pickup apparatus according to claim 2, wherein the swing axis is disposed in the vicinity of a pixel on the image pickup surface at a position offset from the middle of one edge of the image pickup surface and the other edge of the image pickup surface.

5. The image pickup apparatus according to claim 4, wherein the swing axis is disposed in the vicinity of a pixel on the image pickup surface at the one edge of the image pickup surface or at the other edge of the image pickup surface.

6. The image pickup apparatus according to claim 1, wherein the image pickup element tilting unit can set the angle of the image pickup element relative to the optical axis arbitrarily.

7. The image pickup apparatus according to claim 1, wherein the image pickup element tilting unit changes the angle of the image pickup element relative to the optical axis in such a way that the angle of the image pickup element at the time of the first image picking-up and the angle of the image pickup element at the time of the second image picking-up are substantially symmetrical with each other with respect to the optical axis.

8. The image pickup apparatus according to claim 1, wherein the image pickup element tilting unit changes the angle of the image pickup element relative to the optical axis in such a way that the angle of the image pickup element at the time of the first image picking-up and the angle of the image pickup element at the time of the second image picking-up are not symmetrical with each other with respect to the optical axis.

9. The image pickup apparatus according to claim 8, wherein if the image pickup surface is not oriented at an angle substantially perpendicular to the optical axis at the time of the first image picking-up, the image pickup element tilting unit changes the angle to make the image pickup surface substantially perpendicular to the optical axis at the time of second image picking-up.

10. The image pickup apparatus according to claim 1, wherein the image pickup element tilting unit changes the angle of the image pickup surface to make the image pickup surface substantially perpendicular to the optical axis at the time of the first image picking-up.

11. The image pickup apparatus according to claim 1, wherein the image pickup element tilting unit changes the angle of the image pickup surface relative to the optical axis during a blanking interval.

12. The image pickup apparatus according to claim 2, further comprising:
   a sensor that detects the orientation of the image pickup apparatus;
   a second swing axis that extends in a direction perpendicular to the swing axis in a plane parallel to the image pickup surface and supports the image pickup surface in such a way that the image pickup axis is allowed to swing; and
   a tilt axis selector that selects, from among the swing axis and the second swing axis, a swing axis to be used to change the angle of the image pickup surface, based on a result of detection by the sensor.

* * * * *